United States Patent
Alva et al.

(10) Patent No.: US 9,600,199 B2
(45) Date of Patent: *Mar. 21, 2017

(54) INCREASING STORAGE SPACE FOR PROCESSES IMPACTING DATA STORAGE SYSTEMS

(71) Applicant: International Business Machines Corporation, Armonk, NY (US)

(72) Inventors: Prajwal M. Alva, Bangalore (IN); Sindury R. R. Baddam, Solapur (IN); Michael Bender, Rye Brook, NY (US); Kiran K. Kompala, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/225,111

(22) Filed: Aug. 1, 2016

(65) Prior Publication Data
US 2017/0010835 A1  Jan. 12, 2017

Related U.S. Application Data

(63) Continuation of application No. 14/982,397, filed on Dec. 29, 2015, which is a continuation of application No. 14/796,379, filed on Jul. 10, 2015.

(51) Int. Cl.
*H04N 1/04* (2006.01)
*G06F 3/06* (2006.01)

(52) U.S. Cl.
CPC .......... *G06F 3/0631* (2013.01); *G06F 3/0604* (2013.01); *G06F 3/0683* (2013.01)

(58) Field of Classification Search
CPC ..... G06F 3/0631; G06F 3/0604; G06F 3/0683
USPC ................. 358/1.13, 1.9, 448, 474
See application file for complete search history.

(56) References Cited

U.S. PATENT DOCUMENTS

| 8,521,986 | B2 * | 8/2013 | Beckmann ............ G06F 3/0608 711/163 |
| 9,092,502 | B1 | 7/2015 | Cannaliato et al. |
| 2012/0058721 | A1 * | 3/2012 | Fok .......................... H04L 67/06 455/41.1 |
| 2013/0110790 | A1 * | 5/2013 | Matsumoto ............. G06F 12/00 707/679 |
| 2015/0256475 | A1 | 9/2015 | Suman et al. |

FOREIGN PATENT DOCUMENTS

CN  104050042 A  9/2014

* cited by examiner

*Primary Examiner* — Houshang Safaipour
(74) *Attorney, Agent, or Firm* — David S. Richart

(57) ABSTRACT

A processing request is received. The processing request includes information about a first location where a set of data is stored and information about a second location where the set of data is to be transferred. The size of the set of data is determined. The size of the available portion of the second location is determined. If the size of the set of data is smaller than the size of the available portion of the second location is determined. Responsive to determining the size of the set of data is larger than the size of the available portion of the second location, the size of the available portion is requested to be increased. The size of the available portion of the second location is increased to a size larger than the determined size of the set of data.

1 Claim, 5 Drawing Sheets

INCREASING STORAGE SPACE FOR PROCESSES IMPACTING DATA STORAGE SYSTEMS

BACKGROUND

The present invention relates generally to the field of data storage, and more particularly to increasing storage space for processes in data storage systems.

In computer software, and particularly computer databases, the term "data warehouse" is generally used to refer to a unified data repository for all customer-centric data. A data warehouse environment tends to be quite large and can store a significant amount of data. The data stored in the data warehouse can be cleaned, transformed, and catalogued. The data can be used by business professionals for performing business related operations, such as data mining, online analytical processing, and decision support. Typically, a data warehouse is associated with an extract, transform, and load (ETL) processes and business intelligence tools. The ETL processes are capable of extracting data from source systems and bringing the data into a data warehouse.

SUMMARY

Embodiments of the present invention include a method, computer program product, and system for managing data storage. In one embodiment, a processing request is received. The processing request includes information about a first location where a set of data is stored and information about a second location where the set of data is to be transferred. The size of the set of data is determined. The size of the available portion of the second location is determined. If the size of the set of data is smaller than the size of the available portion of the second location is determined. Responsive to determining the size of the set of data is larger than the size of the available portion of the second location, the size of the available portion is requested to be increased. The size of the available portion of the second location is increased to a size larger than the determined size of the set of data.

DETAILED DESCRIPTION

Figure 1:
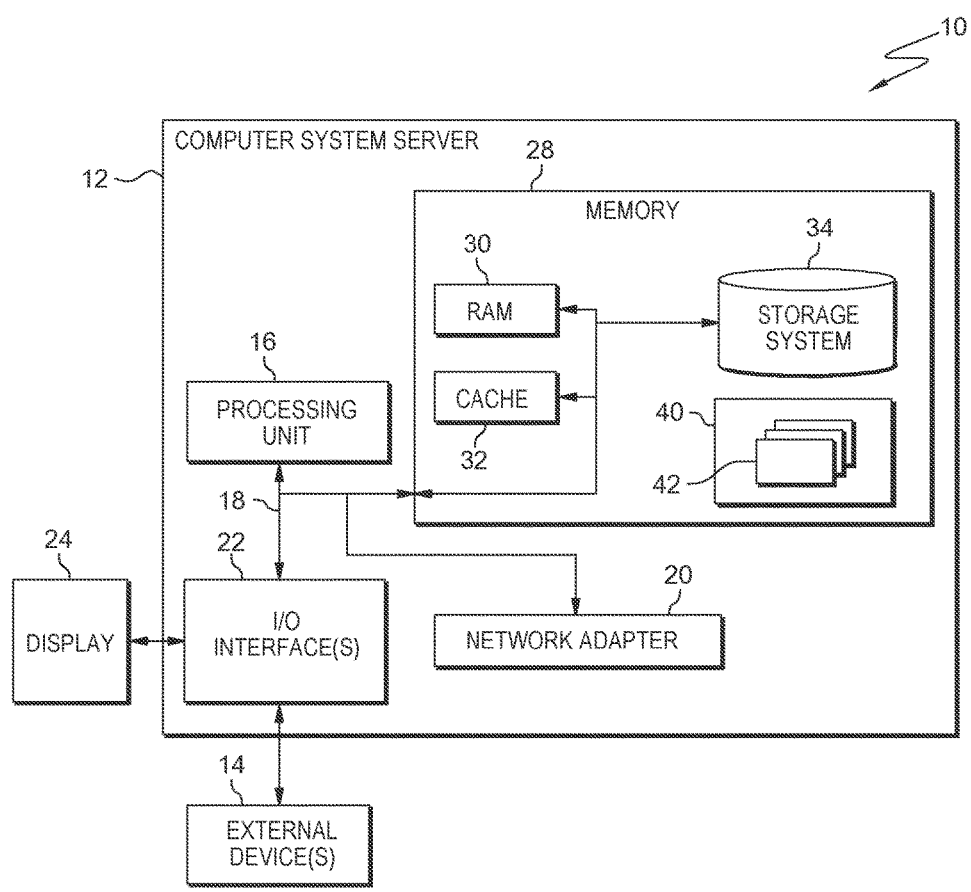
FIG. 1 depicts a cloud computing node, in accordance with an embodiment of the present invention.

Embodiments of the present invention provide for managing data storage in a data processing environment. Embodiments of the present invention provide for receiving a processing request that includes the movement of data from one location to another. Embodiments of the present invention can provide for modifying the data before it is stored in the new location. Embodiments of the present invention determine the size of the location the data is to be stored and the size of the data to be stored. Embodiments of the present invention determine if the size of the data to be stored is less than the size of the location the data is to be stored. Embodiments of the present invention provide for, if the size of the data to be stored is larger than the size of the location the data is to be stored, requesting an increase in the size of the location the data is to be stored. Embodiments of the present invention provide for, after the size of the location the data is to be stored is increased to a size larger than the size of the data to be stored, initiating the processing request.

Embodiments of the present invention recognize that programs do not know the amount of space available at the target location when processing data. Embodiments of the present invention recognize that it would be advantageous for a program to dynamically increase the space allocated to the program for the process so as to have enough space to process data. Embodiments of the present invention recognize that currently, programs abort their processing of data when the target system does not have sufficient space to store the data being processed.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. The present invention will now be described in detail with reference to the Figures.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
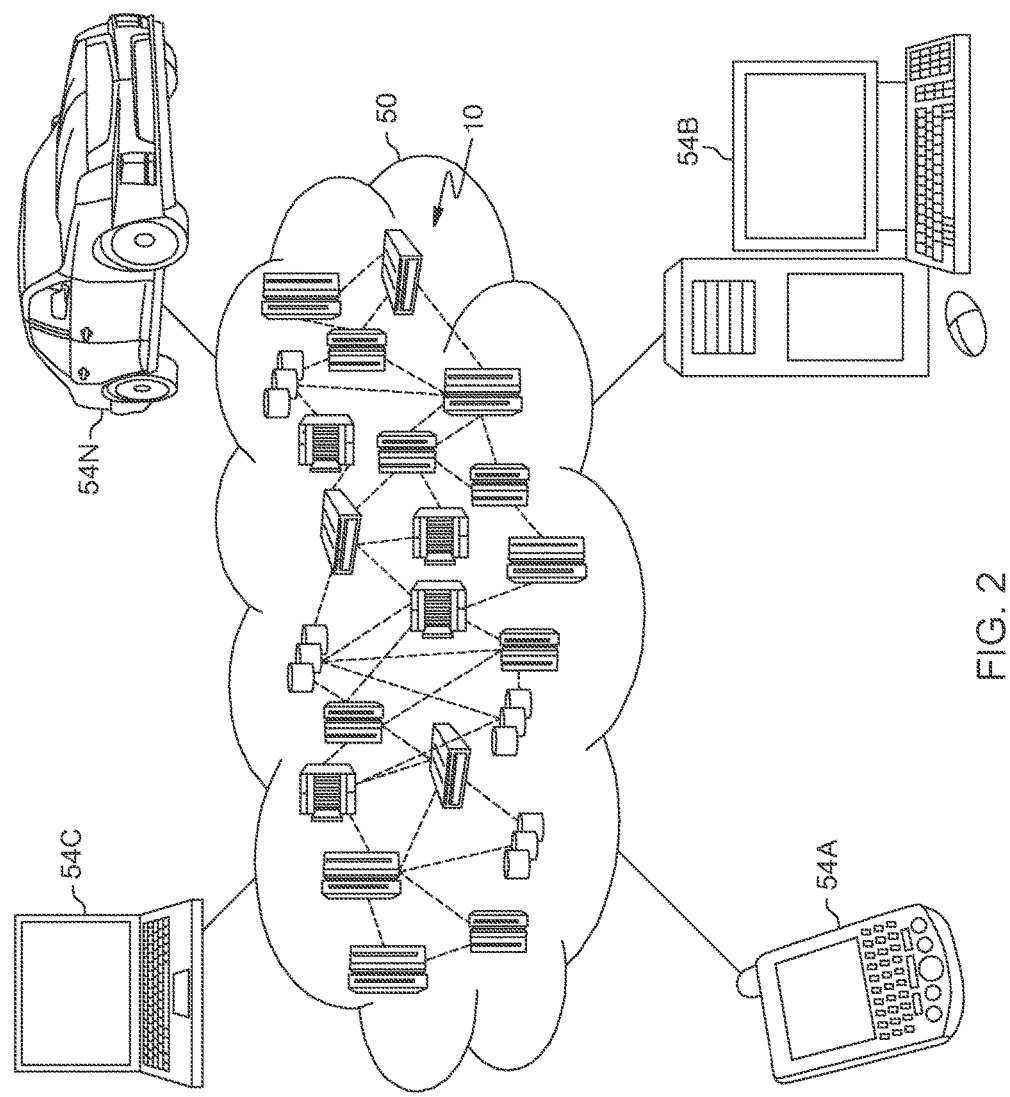
FIG. 2 depicts a cloud computing environment, in accordance with an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
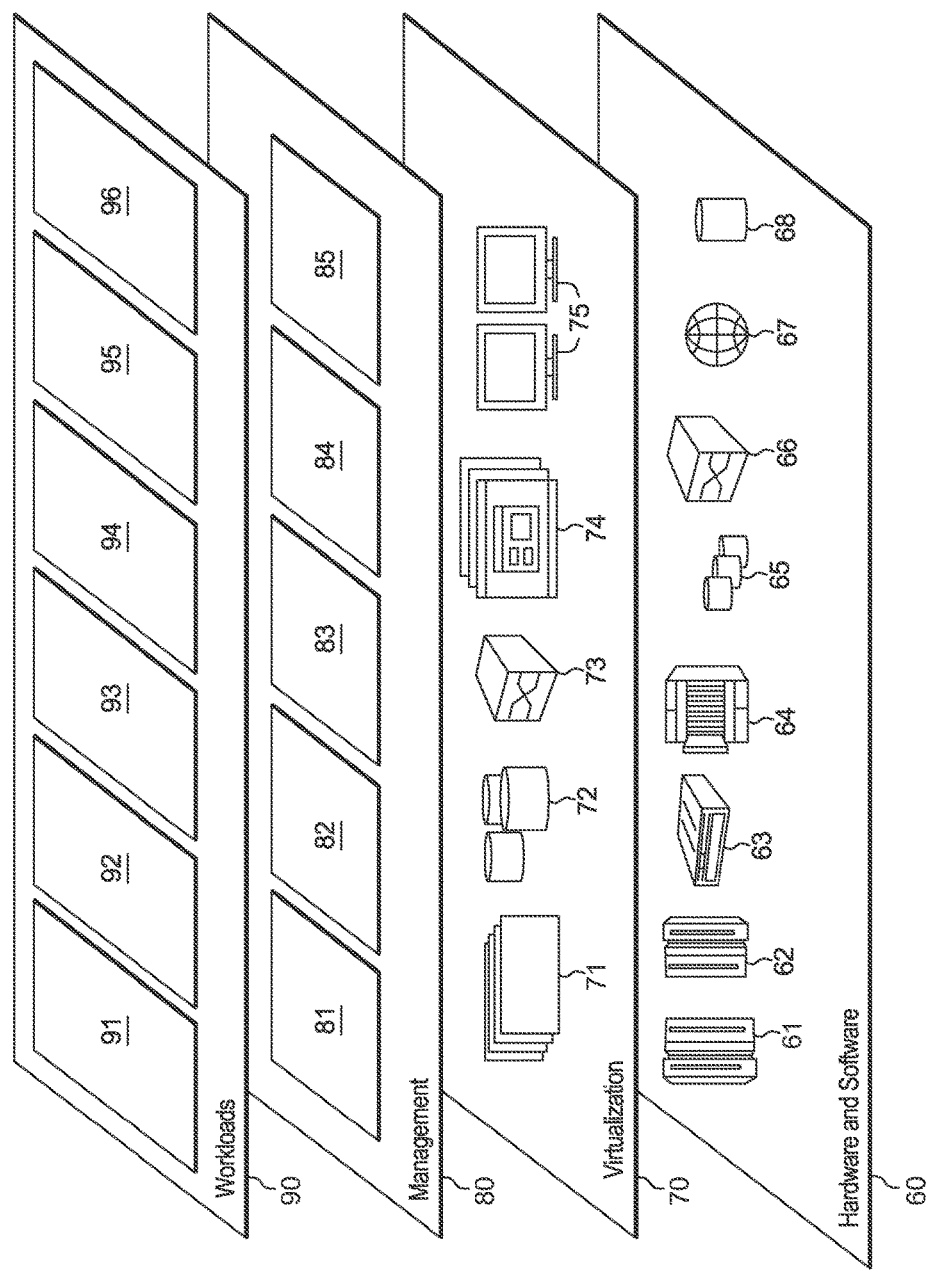
FIG. 3 depicts abstraction model layers, in accordance with an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data management 96.

Figure 4:
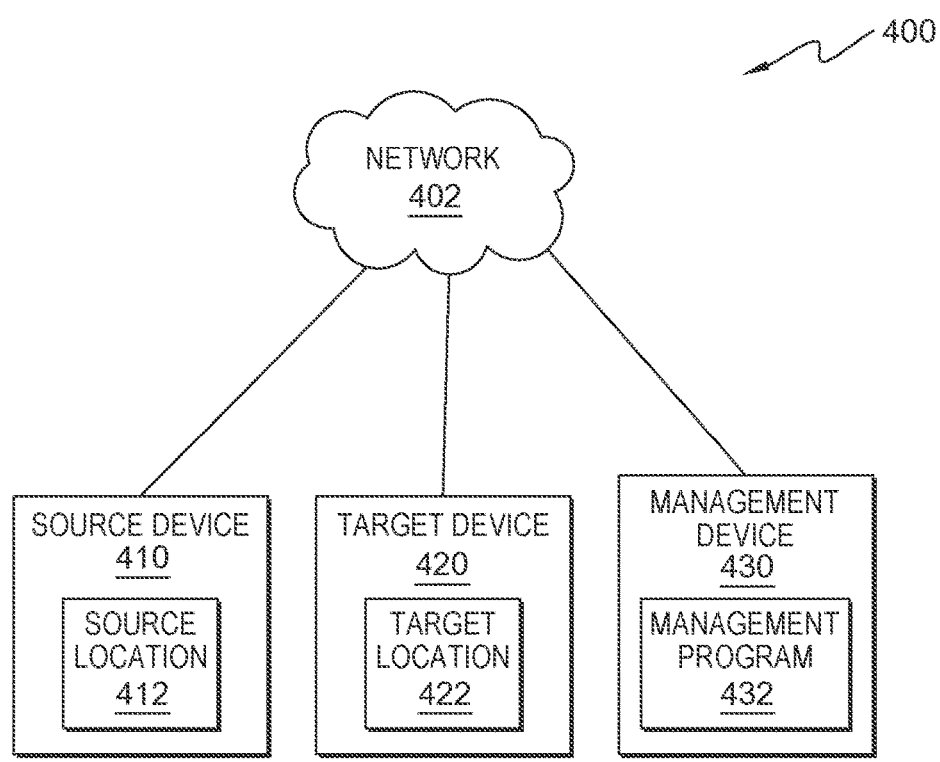
FIG. 4 depicts a functional block diagram of a data processing environment, in accordance with an embodiment of the present invention.

FIG. 4 is a functional block diagram illustrating a data processing environment, generally designated 400, in accordance with one embodiment of the present invention. FIG. 4 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

An embodiment of data processing environment 400 includes source device 410, target device 420 and management device 430, interconnected over network 402. Network 402 can be, for example, a local area network (LAN), a telecommunications network, a wide area network (WAN) such as the Internet, or any combination of the three, and include wired, wireless, or fiber optic connections. In general, network 402 can be any combination of connections and protocols that will support communications between source device 410, target device 420, and management device 430, and any other computer connected to network 402, in accordance with embodiments of the present invention.

In example embodiments, source device 410 can be a laptop, tablet, or netbook personal computer (PC), a desktop computer, a personal digital assistant (PDA), a smart phone, or any programmable electronic device capable of communicating with any computing device within data processing environment 400. In certain embodiments, source device 410 collectively represents a computer system utilizing clustered computers and components (e.g., database server computers, application server computers, etc.) that act as a single pool of seamless resources when accessed by elements of data processing environment 400, such as in a cloud computing environment. In general, source device 410 is representative of any electronic device or combination of electronic devices capable of executing computer readable program instructions. Source device 410 can include components as depicted and described in detail with respect to cloud computing node 10, as described in reference to FIG. 1, in accordance with embodiments of the present invention. Target device 420 and management device 430 can be substantially similar to source device 410 and have substantially similar components. Source device 410, target device 420, and management device 430 can be nodes that are part of cloud computing environment 50.

In an embodiment, source device 410 includes source location 412. Source location 412 is an organized collection of data. Data found in source location 412 is typically organized to model relevant aspects of reality in a way that supports processes requiring the information found in source location. Source location 412 can be implemented with any type of storage device capable of storing data that can be accessed and utilized by source device 410, such as a database server, a hard disk drive, or a flash memory. In other embodiments, source location 412 can be implemented with multiple storage devices within source device 410. In an embodiment, source location 412 is the location of the source file (i.e. data) to be processed by management program 432.

Alternatively, source location 412 can be implemented with any computer readable storage medium as found in the art. For example, the computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

In an embodiment, target device 420 includes target location 422. Target location 422 is an organized collection of data. Data found in target location 422 is typically organized to model relevant aspects of reality in a way that supports processes requiring the information found in target location. Target location 422 can be implemented with any type of storage device capable of storing data that can be accessed and utilized by target device 420, such as a database server, a hard disk drive, or a flash memory. In other embodiments, target location 422 can be implemented with multiple storage devices within target device 420. In an embodiment, target location 422 is the destination of source file (i.e., data), from source location 412, which is processed by management program 432 or another program (not shown). In an alternative embodiment, target location 422 can be located on the same device as source location 412.

Alternatively, target location 422 can be implemented with any computer readable storage medium as found in the art. For example, the computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

In one embodiment, management device 430 includes management program 432. Management program 432 is a program, application, or subprogram of a larger program that manages data storage in data processing environment 400. In an embodiment, management program 432 can manage data storage when data is transferred between source location 412 on source device 410 and target location 422 on target device 420. In an alternative embodiment, management program 432 can manage data storage when data is transferred between any computer(s) (not shown) that can interact with network 402. In an embodiment, management program 432 can be located anywhere that can interact computing devices accessible via network 402 but manage data storage in any location accessible via the network.

Management program 432 receives a request to process data from a source device 410 to a target device 420 via network 402. In an embodiment, the processing can be to a single file. In an alternative embodiment, the processing can occur to more than one file. In an embodiment, the processing request can be moving data from source location 412 to target location 422. In an alternative embodiment, the processing request can be moving data from source location 412 to target location 422 but modifying the data before the data is stored at target location. The data can be modified on source device 410 before the data is transferred via network 402, after the data has left source device and before the data reaches target device 420 via another program (not shown) accessible via network, or on target device but before the data is stored to target location 422. The request includes the source file (i.e. data) and source location 412 of the source file and the target location 422 of the file after processing. Management program 432 determines the target location storage size and then determines the output size of the source file after processing. Management program 432 determines if the output file size is smaller than the target location 422 size, and if management program determines the output file size is smaller than the target location size, management program initiates the processing request. If management program 432 determines the output file size is larger than the target location 422 size, management program requests an increase in the target location size. In an embodiment, the target location 422 size can be increased via resources of cloud computing nodes 10, discussed previously. In an alternative embodiment, the target location 422 size can be increase via resources of target device 420. Upon receiving an indication that the target location 422 size has increased as requested, management program 432 initiates the processing request.

In any embodiment, management program 432 can include a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, the user interface can be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements. For example, client application can be a web browser, a database program, etc.

Figure 5:
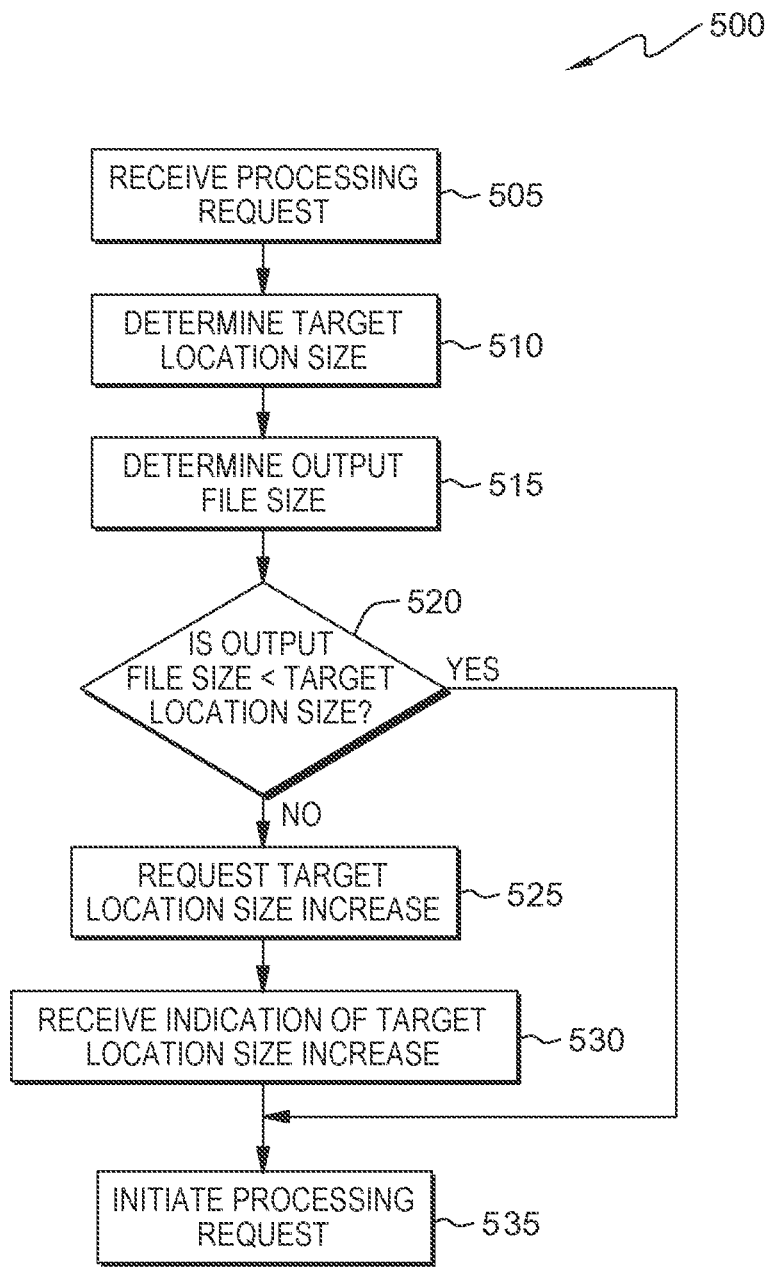
FIG. 5 depicts a flowchart of operational steps of a program for managing data storage, in accordance with an embodiment of the present invention.

FIG. 5 is a flowchart of workflow 500 depicting operational steps for managing data storage in a data processing environment 400, in accordance with an embodiment of the present invention. Workflow 500 represents the operational steps to perform data management 96 in workloads layer 90. In one embodiment, the steps of the workflow are performed by management program 432. In an alternative embodiment, steps of the workflow can be performed by any other program while working with management program 432. In a preferred embodiment, a user, via a user interface discussed previously, can invoke workflow 500 upon determining that they would like to process data from one location (i.e. source location 412) to another location (i.e. target location 422). In an alternative embodiment, workflow 500 can be invoked automatically under the control of another program, for example, upon a user of source device 410 indicating to a program (not shown) to move data from source location 412 to target location 422 and management program 432 can begin a step in workflow 500.

Management program 432 receives a processing request (step 505). In an embodiment, management program 432 can be notified by a user via user interface, discussed previously, of a processing request. In an alternative embodiment, management program 432 can be notified of a processing request from another program (not shown). In an embodiment, the processing request can include the source file (i.e. data) to be processed, the source location 412 of the data, and the target location 422 of the data. In an alternative embodiment, the processing request can also include information about transformation of the data that can occur when the data is moved from source location 412 to target location 422. For example, management program 432 can receive a processing request that is an Extract, Transform, Load (ETL) request. An ETL request includes an extraction of data from homogeneous or heterogeneous data sources, transforming the data for storing in a proper format or structure for querying and analysis purposes, and then loading the transformed data into the final target. Management program 432 can work with an ETL program (not shown) to complete the processing request. In the processing request, management program 432 receives information about the data including the source location 412 found on source device 410 and the target location 422 found on target device 420. In an alternative embodiment, target location 422 can be found on the same device that source location 412 is located on.

Management program 432 determines the target location size (step 510). In other words, management program determines the size of the data storage available on the target location of the processing request. In an embodiment, management program 432 can query target device 420 and request the size of target location 422. In an alternative embodiment, the size of target location 422 can be included in the processing request received in step 510. For example, management program 432 queries a program (not shown) on target device 420, requesting the size of target location 422. Management program 432 receives an indication that the size of target location 422 is 1.475 gigabytes (GB).

Management program 432 determines the output file size (step 515). In other words, management program 432 determines the size of the source file, after processing occurs, that will be stored in target location 422. In an embodiment, the source file is being moved from source location 412 to target location 422 and no modification to the source file occur and the size of the source file in the source location is the same as the size of the output file size in the target location. In an alternative embodiment, the size of source file, stored in source location 412, can be different than the size of the output file, stored in target location 422. In an alternative embodiment, management program 432 can determine the output file size with the help of another program (not shown). For example, when an ETL request occurs, the source file is transformed to the output file and the size of the files are different. Management program 432, in conjunction with ETL program (not shown), determines, the size of the source file is 1.352 GB and after the transformation of the file, the size of the output file is 1.531 GB. In an alternative example, multiple source files or systems can be processed. During processing, the fields of the source files can be determined and then a subset of the fields can be selected. Management program 432 can determine the largest row size in the fields and then multiply that by the largest row size possible to determine the output file size. Additionally, supporting infrastructure can be required, such as a database index, and the size of the supporting infrastructure is added to the output file size.

Management program 432 determines if the output file size is smaller than the target location size (decision block 520). In an embodiment, management program 432 determines if size of target location 422 is large enough to store the output file based on the size of the output file. If management program 432 determines output file size is less than target location size (decision block 520, YES branch), management program proceeds to step 535. For example, management program 432 determines that the output file size (1.422 GB) is smaller than the size of the target location 422 (1.475 GB). In an alternative embodiment, if the output file size is equal to the target location size, management program 432 proceeds to step 535.

If management program 432 determines the output file size is larger than the target location size (decision block 520, NO branch), management program requests the target location size increase (step 525). For example, management program 432 determines that the output file size (1.532 GB) is larger than the size of the target location 422 (1.475 GB). In an embodiment, management program 432 can increase the size of target location 422. In an alternative embodiment, management program 432 can request another program (not shown), for example a program found on target device 420, to increase the size of target location. Management program 432 can request for the size of target location 422 to be any size equal to or larger than the size of the output file. In an embodiment, management program 432 can request the storage devices that will be used to increase the size of target location 422. In an alternative embodiment, management program 432 can request that another program determine the storage devices that will be used to increase the size of target location. In an example, management program 432 can request for the size of target location 422 to increase using storage devices (not shown) found on target device 420. In another example, management program 432 can request for the size of target location 422 to increase using storage devices (not shown) not found on target device 420 but accessible to target device via network 402. In yet another example, management program 432 can request for the size of target location 422 to increase via resources of cloud computing nodes 10, discussed previously.

Management program 432 receives an indication of target location size increase (step 530). In an embodiment, management program 432 completes the increase of the size of target location 422 and then monitor program can proceed to step 535. In an alternative embodiment, management program 432 receives an indication from another program (not shown) that the size of target location 422 has increased and management program then can proceed to step 535. In an embodiment, the size of target location 422 increases to a size equal to or larger than the size of the output file.

Management program 432 initiates processing request (step 535). In an embodiment, management program 432 initiates the processing request for source file in source location 412 to move to target location 422. In an alternative embodiment, management program 432, in conjunction with source device 410 and target device 420, initiates the processing request for source file in source location 412 to move to target location 422. In an alternative embodiment, management program 432 can indicate to another program (not shown), found on source device 410, target device 420, management device 430 or any other device (not shown) connected via network 402, to initiate the processing request.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for managing data storage, the computer program product comprising:
   one or more non-transitory computer readable storage media storing computer executable instructions, the computer executable instructions comprising:
   computer executable instructions to receive a processing request, wherein the processing request includes information about a first location where a set of data is stored, information about a second location where the set of data is to be transferred, and the set of data being modified before moving the data to the second location, and wherein the process is an extract, transform, and load process, and wherein the set of data is one or more files;
   computer executable instructions to determine a size of the set of data;
   computer executable instructions to determine a size of an available portion of the second location;
   computer executable instructions to determine if the size of the set of data is smaller than the size of the available portion of the second location;
   computer executable instructions, responsive to determining the size of the set of data is larger than the size of the available portion of the second location, to request the size of the available portion of the second location be increased, wherein the size of the available portion of the second location is increased to a size larger than the determined size of the set of data, and wherein the size of the available portion of the second location is increased using cloud resources;
   computer executable instructions to determine the size of the modified set of data;
   computer executable instructions to determine if the size of the modified set of data is smaller than the size of the available portion of the second location;
   computer executable instructions, responsive to determining the size of the modified set of data is larger than the size of the available portion of the second location, to request the size of the available portion of the second location be increased, wherein the size of the available portion of the second location is increased to a size larger than the determined size of the modified set of data; and
   computer executable instructions, responsive to receiving an indication that the size of the available portion of the second location has increased, to initiate the processing request.

* * * * *